United States Patent [19]

Moore et al.

[11] 4,061,600

[45] Dec. 6, 1977

[54] GRAPHITE ELECTRODE AND METHOD OF MAKING

[75] Inventors: Arthur William Moore, North Olmsted; Herbert Franz Volk, Parma, both of Ohio; Jack Kenneth Merrow, Seattle, Wash.

[73] Assignee: Union Carbide Corporation, New York, N.Y.

[21] Appl. No.: 685,140

[22] Filed: May 11, 1976

Related U.S. Application Data

[63] Continuation-in-part of Ser. No. 478,590, June 12, 1974, abandoned.

[51] Int. Cl.$^2$ .............................................. H01B 1/06
[52] U.S. Cl. .................................. 252/510; 252/502; 204/294; 201/5
[58] Field of Search .................... 252/502, 510; 201/5, 201/6, 17; 423/461; 106/284, 273 R; 204/294

[56] References Cited

U.S. PATENT DOCUMENTS

| | | | |
|---|---|---|---|
| 3,369,871 | 2/1968 | Hardy et al. | 201/17 X |
| 3,506,745 | 4/1970 | Juel et al. | 201/20 X |
| 3,853,793 | 12/1974 | Brown et al. | 252/510 |

*Primary Examiner*—Benjamin R. Padgett
*Assistant Examiner*—E. Suzanne Parr
*Attorney, Agent, or Firm*—J. Hart Evans

[57] ABSTRACT

Coke intended for use in graphitized articles such as graphite electrodes is thermally desulfurized and made more ordered by heating in the absence of air at a temperature between about 1600° C and 2200° C for a period of at least one hour before the particles are mixed with binder. Coke processed in this manner yields graphite electrodes of superior flexural strength and having lower coefficients of thermal expansion.

28 Claims, No Drawings

GRAPHITE ELECTRODE AND METHOD OF MAKING

RELATED APPLICATIONS

This application is a continuation-in-part of our U.S. Patent application Ser. No. 478,590 filed June 12, 1974, now abandoned.

This invention relates to improved electrodes and a method of making them. More particularly, it relates to a thermal pretreatment which causes partial desulfurization and improved ordering in the cokes. The partially desulfurized, more ordered cokes are found to yield electrodes of improved flexural strength and often with a lower coefficient of thermal expansion.

The problem of electrode coke supply has become more acute in recent years as the preferred low-sulfur cokes have become less available and more expensive. Numerous efforts have been made to desulfurize coke prior to its use as an electrode filler. Pre-graphitization has been employed with relatively low sulfur cokes in an effort to improve electrode properties but when applied to high sulfur cokes results in "puffing" of the coke. "Puffing is an irreversible thermal expansion of the coke which occurs when the sulfur is driven off and which according to the teaching of the prior art results in coke having inferior properties for electrode manufacture. The use of iron oxide as a puffing inhibitor during the pre-graphitization of high sulfur cokes has been taught by the prior art, U.S. Pats. Nos. 3,506,745 and 3,624,231. These pre-graphitization techniques which employ temperatures of 2850° C or higher, are expensive and the graphite obtained shows no increase in strength over regular graphite.

It has long been believed that thermal desulfurization of coke with its attendant puffing would result in coke which would yield low density, low strength graphite. We have now found, however, that contrary to these expectations, heating coke in a particular calcining temperature range well below graphitization temperatures will produce an improved coke. When mixed with pitch and formed and baked in the conventional manner this coke yields a graphite having 20 to 50 percent higher flexural strength and a co-efficient of thermal expansion or CTE 20 percent lower than graphite made from conventionally calcined coke. Furthermore coke treated according to our invention yields electrodes with flexural strengths markedly better than electrodes made from coke pre-graphitized according to the prior art, with or without puffing inhibitors.

According to our invention petroleum or coal-derived coke particles are heated in the absence of air at a temperature between about 1600° C and about 2200° C for 0.1 hour or more prior to mixing the particles with binder. In the case of relatively high sulfur content cokes, those containing about one percent by weight or more of sulfur, the preferred temperature range is between about 1600° C and about 1770° C. For the lower sulfur content cokes, those containing less that about one percent sulfur by weight, the preferred temperature range is between about 1900° C and about 2200° C. Preferably, normally calcined coke is heated to about 1350° or 1400° C and then heated at a controlled rate of about 50° to 250° C per hour to the treatment temperature at which it is held for at least 0.1 hour or more, depending on the temperature. About two hours at the treatment temperature is preferred for most cokes. The heating according to our process can be applied to coke which has already been conventionally calcined at 1350° – 1400° C or can be applied directly to raw coke in a single heat treatment step.

Since thermal desulfurization and ordering are kinetic processes, it is obviously possible to apply equivalent heat treatments to a coke at various combinations of temperature and time. However, it becomes impractical to apply uniform heating to larger coke particles in periods much less than 0.1 hour. On the other hand, calcining temperatures less than 1600° C would require uneconomically long periods of heat treatment. We have not found an upper limit to the rate at which the coke can be heated through the desulfurization temperature range. "Flash calcining" of coke at an estimated heating rate of 100,000° C/hr yielded the same improvements abserved with coke heated at the more normal rates of 50°–250° C/hr.

Electrode properties are improved substantially even when only a portion of the coke filler is treated according to our invention. Coke filler for electrodes usually consists of a mixture of relatively large particles, 1/16 to 1/4 inch or larger and relatively fine particles or "flour" as it is called. We have found that if the larger particles in a coke filler mix are processed according to our invention, all or part of the flour can be conventionally calcined coke without our added processing and the mix will still yield improved electrodes. Improvements in electrode properties, though proportionately smaller, can also be obtained when only a portion of the particles are processed according to the invention.

It can be seen from the examples that the process of the invention results in coke which requires more binder or pitch on a weight basis when it is extruded into electrodes or the like than does conventionally calcined coke. This increased binder demand by the coke means that more volatiles from the binder must be driven off when the electrode is baked. This would be expected to mean more voids in the electrode with attendant poor structure in the electrode product. Surprisingly, this is not the case and as the examples show, processing according to the invention improves the strength and CTE of the final product despite the higher binder content in the green electrode prior to baking.

In the examples which follow it will be seen that the application of our process has resulted in improved flexural strength in every sample processed according to the invention, as compared with conventionally calcined coke as well as with the coke pre-graphitized according to the prior art, both with and without the addition of iron oxide. Similar improvements in properties have also been observed when filler processed according to the invention was used in making electrodes which were pitch impregnated prior to graphitization.

Table A shows the compositions the four standard electrode mixes which were used throughout the examples.

Table A

Distribution of Particle Sizes in Four Types of Electrode Mix

| Mix Type | Percentage of Total Coke Weight | | | | |
| --- | --- | --- | --- | --- | --- |
| | 3/6 Mesh | 6/10 Mesh | 10/20 Mesh | 20/35 Mesh | 55% Through 200 Mesh |
| A | 30 | 12.8 | 17.3 | — | 40 |
| B | — | — | 36.7 | 18.3 | 45 |
| C | — | 33 | — | 17 | 50 |
| D | — | — | — | 50 | 50 |

EXAMPLE I

A six hundred pound sample of rotary calcined high sulfur premium (low CTE) petroleum coke having a sulfur content of 1.3 percent by weight was placed in a 20 inch diameter by six foot long graphite induction furnace and processed according to the invention. It was heated in the absence of air to 1400° C and then the temperature was raised at the rate of 100° C per hour to 1700° C and the coke was held at a temperature of 1700° C for two hours and then allowed to cool. This sample (I-a) after cooling had a sulfur content of only 0.3 percent by weight. A second sample of the same coke was in the manner of the prior art, mixed with 2 percent by weight of iron oxide and heated in the absence of air in the same furnace to a temperature of 1400° C. The temperature was then raised at the rate of 250° C per hour to 2850° C and then held at this graphitizing temperature of 2850° C for one hour producing sample I-b. A third sample I-c, a control sample, had been heated in the absence of air in a rotary calciner to the conventional calcining temperature of 1350° C and held at this temperature for one hour. Each sample was crushed and screened to product particles having sizes which would pass through 3 mesh while being held on 20 mesh. From sample I-c a portion of material was also milled to produce flour or fine particles, 55% of which would pass through 200 mesh, with 45% passing through 35 mesh and held on 200 mesh. All number screen sizes are standard "Tyler Mesh".

Three electrode mixes of type A (see Table A) were made using petroleum coke fillers consisting of 60 percent by weight of particles from each of samples I-a, I-b and I-c mixed with 40 percent by weight of flour from sample I-c, using sufficient binder. The binder was a coal tar pitch with a softening temperature of 110° C. Mix No. 1 made using sample I-a particles and I-c flour, required 27.0 parts per hundred by weight of pitch and after extrusion into billets had a green density of 1.70 grams per cubic centimeter. Mix No. 2 made with sample I-b particles and I-c flour required 28.0 parts per hundred by weight of pitch and had a density of 1.71 grams per cubic centimeter after extrusion. Mix No. 3 made with sample I-c particles and I-c flour required 24 parts per hundred by weight of pitch and had an extruded green density of 1.76 grams per cubic centimeter.

The formed 6 inch diameter electrodes were cut into 18 inch long billets. Two billets from each electrode mix were packed in coke inside an electrically heated pot furnace and heated at a rate of 2° C per hour up to 500° C, then at 5° C per hour up to 850° C and then held at the baking temperature of 850° C for one hour. The electrode billets were then graphitized by packing them in coke inside a graphite induction furnace and heating them at the rate of 350° C per hour to 2850° C and then holding at the graphitizing temperature of 2850° C for four hours. From each of the two graphitized electrode billets made from each of the three electrode mixes there were cut 11 with-grain and 9 cross-grain test samples for measurement of density, resistivity and flexural strength and 2 with-grain and 2 cross-grain samples for measurement of coefficient of thermal expansion. For each electrode mix, these physical property results were numerically averaged with the following results. The resistivity is reported in ohms × centimeters × $10^{-4}$, the flexural strength in pounds per square inch and the coefficient of thermal expansion in centimeters per centimeter per degree C. × $10^{-6}$.

For the electrodes made using Mix No. 1 employing particles made according to the invention, the average density was 1.65 grams per cubic centimeter, the average resistivity measured with grain was 6.7 and against the grain 10.8, the average flexural strength measured with the grain was 1470 and against the grain 970, while the average coefficient of thermal expansion measured with the grain was 0.60 and against the grain 2.04. For the electrodes made from Mix No. 2, using particles according to the prior art, the average density was 1.64 grams per cubic centimeter, the average resistivity measured with the grain was 6.8 and against the grain 11.6, the average flexural strength measured with the grain was 1230 and against the grain 880, while the average coefficient of thermal expansion measured with the grain was 0.70 and against the grain 2.26. For the Mix No. 3, a control mix made with conventionally calcined particles, the average density was 1.65 grams per cubic centimeter, the average resistivity measured with the grain was 7.4 and against the grain 11.2, the average flexural strength measured with the grain was 1020 and against the grain 760, while the average coefficient of thermal expansion measured with the grain was 0.80 and against the grain 2.07. The improved properties obtained in graphite electrodes made with cokes processed according to our invention can be readily seen in the table below.

Table I

| | Forming Data | | | | Graphite Properties | | | |
|---|---|---|---|---|---|---|---|---|
| | Type of Coke | | | Green Dens-ity | Dens-ity | Flex Strength psi | | WG CTE $10^{-6°}$ |
| Mix No. | Par-ticles | Flour | pph Pitch | | Mg/m³ | WG | AG | C |
| 1 Inv. | I-a | I-c | 27.0 | 1.70 | 1.65 | 1470 | 970 | 0.60 |
| 2 Prior Art | I-b | I-c | 28.0 | 1.71 | 1.64 | 1230 | 880 | 0.70 |
| 3 Con-trol | I-c | I-c | 24.0 | 1.76 | 1.65 | 1020 | 760 | 0.80 |

I-c = rotary calcined premium petroleum coke containing 1.3% sulfur
I-a = calcined at 1700° C according to invention (0.3% sulfur)
I-b = graphitized at 2850° C (0% sulfur)
Mix No. 1 = Invention
Mix No. 2 = Prior Art
Mix No. 3 = Control

EXAMPLE II

A six hundred pound sample of rotary calcined low sulfur premium petroleum coke having a sulfur content of 0.7 percent by weight was placed in a 20 inch diameter of six foot long graphite induction furnace and processed according to the invention. It was heated in the absence of air to 1400° C and then the temperature was raised at the rate of 100° C per hour to 2200° C and the coke was held at a temperature of 2200° C for two hours and then allowed to cool, Sample II-a. Upon analysis after cooling it was found to have a sulfur content of only 0.1 percent by weight. A second sample of the same coke was, in the manner of the prior art, mixed with 2 percent by weight of $Fe_2O_3$ and heated in the absence of air in the same furnace to a temperature of 1400° C. The temperature was then raised at the rate of 250° C per hour to 2800° C and then held at this graphitizing temperature of 2850° C for one hour thereby producing sample II-b. A third sample II-c, a control sample, had been heated in the absence of air in a rotary calciner to the conventional calcining temperature of 1350° C and held at this temperature for one hour. Each sample was crushed and screened to produce particles having the sizes necessary for making a mix of type A. From sample II-c a portion of material was also milled to produce flour or fine particles, 55% of which would pass through 200 mesh with 45% passing through 35 mesh and held on 200 mesh.

Three electrode mixes were made using petroleum coke filler consisting of 60 percent by weight of particles from each of samples II-a, II-b and II-c with 40 percent by weight each of flour from sample II-c, using sufficient binder. The binder was a coal tar pitch with a softening temperature of 110° C. Mix No. 4 made using sample II-a particles and II-c flour required 28.0 parts per hundred by weight of pitch and after extrusion into billets had a green density of 1.70 grams per cubic centimeter. The Mix No. 5 using sample II-b particles and II-c flour required 28.0 parts per hundred by weight of pitch and had a density of 1.74 grams per cubic centimeter after extrusion. The Mix No. 6 using sample II-c particles and flour required 26.0 parts per hundred by weight of pitch and had an extruded green density of 1.75 grams per cubic centimeter. The formed 6 inch diameter electrodes were cut into billets, baked, graphitized and tested in the same manner as in Example I.

For the electrodes made with Mix No. 4, using particles according to the invention from sample II-a, the average density was 1.60 grams per cubic centimeter, the average resistivity measured with grain was 6.6 and against the grain 10.3, the average flexural strength measured with the grain was 1630 and against the grain 1200, while the average coefficient of thermal expansion measured with the grain was 0.62 and against the grain 1.90. For the electrodes made with Mix No. 5, using particles according to the prior art from sample II-b, the average density was 1.64 grams per cubic centimeter, the average resistivity measured with the grain was 6.7 and against the grain 10.6, the average flexural strength measured with the grain was 1300 and against the grain 910, while the average coefficient of thermal expansion measured with the grain was 0.59 and against the grain 1.89. For the electrodes made with Mix No. 6, using conventionally calcined particles from sample II-c, the average density was 1.62 grams per cubic centimeter, the average resistivity measured with the grain was 6.9 and against the grain 10.4, the average flexural strength measured with the grain was 1170 and against the grain 900, while the average coefficient of thermal expansion measured with the grain was 0.72 and against the grain 1.73. The electrode property improvements achieved by our coke calcining process are clearly evident in the table below.

Table II

| Mix No. | Forming Data | | | Graphite Properties | | | |
|---|---|---|---|---|---|---|---|
| | Type of Coke | | pph Pitch | Green Density g/cc | Density g/cc | Flex Strength psi | WG CTE $10^{-6°}$ C |
| | Particles | Flour | | | | WG  AG | |
| 4 Inv. | II-a | II-c | 28.0 | 1.70 | 1.60 | 1630  1200 | 0.62 |
| 5 Prior Art | II-b | II-c | 28.0 | 1.74 | 1.64 | 1300  910 | 0.59 |
| 6 Control | II-c | II-c | 26.0 | 1.75 | 1.62 | 1170  900 | 0.72 |

II-c = rotary calcined premium petroleum coke containing 0.7% sulfur
II-a = II-c calcined at 2200° C according to the invention (0.1% sulfur)
II-b = II-c graphitized at 2850° C (0% sulfur)
Mix No. 4 = Invention
Mix No. 5 = Prior Art
Mix No. 6 = Control

EXAMPLE III

A six hundred pound sample of rotary calcined low sulfur premium petroleum coke having a sulfur content of 0.7 percent by weight was placed in a 20 inch diameter by six foot long graphite induction furnace and processed according to the invention. It was heated in the absence of air to 1400° C and then the temperature was raised at the rate of 100° C per hour to 2000° C and the coke was held at a temperature of 2000° C for two hours and then allowed to cool, yielding sample III-a. A second sample of the same coke was processed according to the invention, in the manner of sample III-a, except that the temperature was raised at the rate of 100° C per hour to 2200° C and the coke held at this temperature for two hours and then allowed to cool. Upon analysis, after cooling, samples III-a and III-b were each found to have a sulfur content of 0.1 percent by weight. A third sample III-c, a control sample, had been heated in the absence of air in a rotary calciner to the conventional calcinating temperature of 1350° C and held at this temperature for one hour. Each sample was crushed and screened to produce the particles and flour needed for mixes of Type B, in which the maximum particle size is much smaller than in mixes of Type A (see Table A).

Four electrode mixes were made using petroleum coke fillers consisting of 55 percent by weight of particles from each of samples III-a, III-b and III-c with 45 percent by weight of flour from different samples, using sufficient binder. The binder was a coal tar pitch with a softening temperature of 110° C. A Mix No. 7 using sample III-a particles and sample III-c flour required 31.0 parts per hundred by weight of pitch and after extrusion into billets had a green density of 1.77 grams per cubic centimeter. A Mix No. 8 using sample III-a flour required 34.0 parts per hundred by weight of pitch and had an extruded green density of 1.74 grams per cubic centimeter. A third Mix No. 9 was prepared using sample III-b particles with the flour component a 50/50 by weight mixture of sample III-b flour and sample III-c flour. This third mix required 32.5 parts per hundred by weight of pitch and after extrusion into billets had a green density of 1.72 grams per cubic centimeter. A fourth Mix No. 10 using both particles and flour from control sample III-c was made and found to require 29.0 parts per hundred by weight of pitch and to have an extruded green density of 1.79 g/cc.

The formed 6 inch diameter electrodes were cut into billets, baked, graphitized and tested in the same manner as in Example I.

For the electrodes made with Mix No. 7, using particles according to the invention from sample III-a and flour from sample III-c, the average density was 1.64 grams per cubic centimeter, the average resistivity measured with the grain was 6.1 and against the grain 10.0, the average flexural strength measured with the grain was 1720 and against the grain 980, while the average coefficient of thermal expansion measured with the grain was 0.53 and against the grain 1.85. For the electrodes made with Mix No. 8, using both particles and flour from sample III-a according to the invention, the average density was 1.65 grams per cubic centimeter, the average resistivity measured with the grain was 6.3 and against the grain 10.9, the average flexural strength measured with the grain was 1820 and against the grain 1040, while the average coefficient of thermal expansion measured with the grain was 0.61 and against the grain 1.98. The electrodes made with Mix No. 9, using particles according to the invention from sample III-b and a mixture of flour from sample III-b and III-c, were found to have an average density of 1.62 grams per cubic centimeter, an average resistivity measured with the grain of 6.4 and against the grain 10.6, an average flexural strength measured with the grain of 1900 and against the grain of 1230, and an average coefficient of expansion measured with the grain of 0.57 and against the grain of 1.93. For the electrodes made with Mix No. 10, using conventionally calcined particles and flour from sample III-c, the average density was 1.65 grams per cubic centimeter, the average resistivity measured with the grain was 6.5 and against the grain 10.5, the average flexural strength measured with the grain was 1280 and against the grain 920, while the average coefficient of thermal expansion measured with the grain was 0.60 and against the grain 1.87. The property improvements in graphite electrodes made with cokes processed according to our invention can be seen in the table below.

Table III

| | Forming Data | | | | Graphite Properties | | | |
|---|---|---|---|---|---|---|---|---|
| | Type of Coke | | | Green Density | Density | Flex Strength psi | | WG CTE $10^{-6°}$ |
| Mix No. | Particles | Flour | pph Pitch | g/cc | g/cc | WG | AG | C |
| 7 Inv. | III-a | III-c | 31.0 | 1.77 | 1.64 | 1720 | 980 | 0.53 |
| 8 Inv. | III-a | III-a | 34.0 | 1.74 | 1.65 | 1820 | 1040 | 0.61 |
| 9 Inv. | III-b | III-b 50% III-c 50% | 32.5 | 1.72 | 1.62 | 1900 | 1230 | 0.57 |
| 10 Control | III-c | III-c | 29.0 | 1.79 | 1.65 | 1280 | 920 | 0.60 |

III-c = rotary calcined premium petroleum coke containing 0.7% sulfur
III-a = III-c calcined at 2000° C according to the invention (0.1% sulfur)
III-b = III-c calcined at 2200° C according to the invention (0.1% sulfur)
Mix Nos. 7 through 9 = Invention Mix No. 10 = Control

EXAMPLE IV

A 600 pound sample of rotary calcined high sulfur premium petroleum coke having a sulfur content of 1.3% by weight was placed in a 20 inch diameter by six foot long graphite induction furnace and processed according to the invention. The temperature was raised at the rate of 100° C per hour to 1700° C and the coke was held at a temperature of 1700° C for two hours and then allowed to cool. Upon analysis after cooling this coke (sample IV-a) was found to have a sulfur content only of 0.3 percent by weight. A second sample IV-b, a control sample, had been heated in the absence of air in a rotary calciner to the conventional calcining temperature of 1350° C and held at this temperature for one hour. Each sample was crushed and screened to produce the particles and flour needed for mixes of Type B (see Table A).

Three electrode mixes were made using petroleum coke fillers consisting of 55 percent by weight of particles from sample IV-a, each mixed with 45 percent by weight of three different flour compositions made using flour from the two samples, all three being mixed with sufficient binder. A fourth and control electrode mix were made using 55 percent by weight of particles from sample IV-b mixed with 45 percent by weight of flour also from sample IV-b, again with sufficient binder added. The binder was a coal tar pitch with a softening temperature of 110° C. A Mix No. 11, using sample IV-a particles and sample IV-b flour, required 29.0 parts per hundred by weight of pitch and after extrusion into billets had a green density of 1.72 grams per cubic centimeter. A Mix No. 12, using sample IV-a particles and sample IV-a flour, required 34.0 pph by weight of pitch and had an extruded green density of 1.66 g/cc. A third Mix No. 13 was prepared using sample IV-a particles with the flour component, a 50/50 by weight mixture of sample IV-a flour and sample IV-b flour. This third mix required 32.0 pph by weight of pitch and after extrusion into billets had a green density of 1.68 g/cc. A fourth Mix No. 14, using both particles and flour from control sample IV-b, was made and found to require 27.0 pph by weight of pitch and to have an extruded green density of 1.79 g/cc.

The formed 6 inch diameter electrodes were cut into billets, baked, graphitized and tested in the same manner as in Example I.

For the electrodes made with Mix No. 11, using particles according to the invention from sample IV-a and flour from sample IV-b, the average density was 1.64 grams per cubic centimeter, the average resistivity measured with the grain was 7.0 and against the grain 12.5, the average flexural strength measured with the grain was 1700 and against the grain 830, while the average coefficient of thermal expansion measured with the grain was 0.76 and against the grain 2.26. For the electrodes made with Mix No. 12, using both particles and flour from sample IV-a according to the invention, the average density was 1.60 grams per cubic centimeter, the average resistivity measured with the grain was 7.9 and against the grain 14.8, the average flexural strength measured with the grain was 1730 and against the grain 800, while the average coefficient of thermal expansion measured with the grain was 0.65 and against the grain 2.37. The electrodes made with Mix No. 13, using particles according to the invention from sample IV-a and a mixture of flour from sample IV-a and IV-b, were found to have an average density of 1.62 grams per cubic centimeter, an average resistivity measured with the grain of 7.3 and against the grain 12.9, an average flexural strength measured with the grain of 1820 and against the grain 990, and an average coefficient of expansion measured with the grain of 0.60 and against the grain of 2.26. For the electrodes made with Mix No. 14, using conventionally calcined particles and flour from sample IV-b, the average density was 1.64 grams per cubic centimeter, the average resistivity measured with the grain was 7.3 and against the grain 12.6, the average flexural strength measured with the grain was 1290 and against the grain 590, while the average coefficient of thermal expansion measured with the grain was 0.87 and against the grain 2.36.

Table IV

| Mix No. | Forming Data ||| Graphite Properties ||||
|---|---|---|---|---|---|---|---|
| | Type of Coke || pph Pitch | Green Density g/cc | Density g/cc | Flex Strength psi || WG CTE 10⁻⁶° C |
| | Particles | Flour | | | | WG | AG | |
| 11 Inv. | IV-a | IV-b | 29.0 | 1.72 | 1.64 | 1700 | 830 | 0.76 |
| 12 Inv. | IV-a | IV-a | 34.0 | 1.66 | 1.60 | 1730 | 800 | 0.65 |
| 13 Inv. | IV-a | 50% IV-a 50% IV-b | 32.0 | 1.68 | 1.62 | 1820 | 990 | 0.60 |
| 14 Control | IV-b | IV-b | 27.0 | 1.79 | 1.64 | 1290 | 590 | 0.87 |

IV-b = rotary calcined premium petroleum coke containing 1.3% sulfur
IV-a = calcined at 1700° C according to invention (0.3% sulfur)
Mix Nos. 11 through 13 = Invention
Mix No. 14 = Control

EXAMPLE V

A six hundred pound sample V-a of rotary calcined high sulfur premium petroleum coke having a sulfur content of 1.4 percent by weight was placed in a 20 inch diameter by six foot long graphite induction furnace and processed according to the invention. It was heated in the absence of air to 1400° C and then the temperature was raised at the rate of 100° C per hour to 1750° C and the coke was held at a temperature of 1750° C for two hours and then allowed to cool. Upon analyses after cooling, this sample (V-a) was found to have a sulfur content of only 0.3 percent by weight. A second sample of the same coke was heated in the absence of air in the same furnace to a temperature of 1400° C, with the temperature then being raised at the rate of 250° C per hour to 3000° C and held at this graphitizing temperature of 3000° C for one hour. This sample is identified as V-b. A third sample of the same coke was, in the manner of the prior art, mixed with 2.5 percent by weight of Fe₂O₃ and then heated in the same sequence to the same temperature as sample V-b. This sample is identified as V-c. A fourth sample V-d, a control sample, had been heated in the absence of air in a rotary calciner to the conventional calcining temperature of 1350° C and held at this temperature for one hour. Each sample was crushed and screened to produce the particles and flour required for mixes of Type B.

Three electrode mixes were made using petroleum coke fillers consisting of 55 percent by weight of particles each of sample V-a and V-c, each mixed with 45 percent by weight of three different flour compositions, all three being mixed with sufficient binder. Sample V-a particles were thus mixed with a 50/50 by weight mixture of sample V-a flour and a sample V-d flour, sample V-b particles were mixed with V-b flour and V-c electrode mix were made using 55 percent by weight of particles from sample IV-d mixed with 45 percent by weight of flow also from sample IV-d, again with sufficient coal tar pitch binder added.

The Mix No. 15, according to the invention, using sample V-a particles and the 50/50 mix of V-a and V-d flour, required 33.0 parts per hundred by weight of pitch and after extrusion into billets had a green density of 1.67 grams per cubic centimeter. The Mix No. 16, using V-b particles and V-b flour, required 35.0 parts per hundred by weight of pitch and after extrusion into billets had a green density of 1.67 grams per cubic centimeter. The other mix, according to the prior art, using V-c particles and V-c flour, (Mix No. 17), required 34.0 parts per hundred by weight of pitch and after extrusion into billets had a green density of 1.72 grams per cubic centimeter. A fourth Mix No. 18, using both particles and flour from control sample V-d, was made and found to require 27.5 parts per hundred by weight of pitch and to have an extruded green density of 1.77 grams per cubic centimeter.

The formed 6 inch diameter electrodes were cut into billets, baked, graphitized and tested in the same manner as in Example I.

For the electrodes made with Mix No. 15, using particles according to the invention from sample V-a and flour from a mixture of samples V-a and V-d, the average density was 1.60 grams per cubic centimeter, the average resistivity measured with the grain was 7.9 and against the grain 13.1, the average flexural strength measured with the grain was 1900 and against the grain 1080, while the average coefficient of thermal expansion measured with the grain was 0.63 and against the grain 2.00. For the electrodes made with Mix No. 16, using both particles and flour from sample V-b, the average density was 1.55 grams per cubic centimeter, the average resistivity measured with the grain was 9.8 and against the grain 17.0, the average flexural strength measured with the grain was 1220 and against the grain 690, while the average coefficient of thermal expansion measured with the grain was 0.49 and against the grain 1.84. The electrodes made with Mix No. 17, using both particles and flour according to the prior art from sample V-c, were found to have an average density of 1.60 grams per cubic centimeter, an average resistivity measured with the grain of 8.5 and against the grain 16.0, an average flexural strength measured with the grain of 1390 and against the grain 680, and an average coefficient of expansion measured with the grain of 0.64 and against the grain of 2.02. For the electrodes made with Mix No. 18, using conventionally calcined particles and flour from sample V-d, the average density was 1.62 grams per cubic centimeter, the average resistivity measured with the grain was 8.8 and against the grain 13.8, the average flexural strength measured with the grain was 1430 and against the grain 860, while the average coefficient of thermal expansion measured with the grain was 1.11 and against the grain 2.20. The improvements in graphite electrode properties obtained with coke calcined according to our invention are summarized in the table below.

TABLE V

| Mix No. | Forming Data ||| Graphite Properties ||||
|---|---|---|---|---|---|---|---|
| | Type of Coke || pph Pitch | Green Density g/cc | Density g/cc | Flex Strength psi || WG CTE 10⁻⁶° C |
| | Particles | Flour | | | | WG | AG | |
| 15 Inv. | V-a | 50% V-a 50% V-d | 33.0 | 1.67 | 1.60 | 1900 | 1080 | 0.63 |
| 16 Prior Art | V-b | V-b | 35.0 | 1.67 | 1.55 | 1220 | 690 | 0.49 |
| 17 Prior Art | V-c | V-c | 34.0 | 1.72 | 1.60 | 1390 | 680 | 0.64 |

TABLE V-continued

| Mix No. | Forming Data | | | Green Density g/cc | Graphite Properties | | | |
|---|---|---|---|---|---|---|---|---|
| | Type of Coke | | pph Pitch | | Density g/cc | Flex Strength psi | | WG CTE $10^{-6°}$ C |
| | Particles | Flour | | | | WG | AG | |
| 18 Control | V-d | V-d | 27.5 | 1.77 | 1.62 | 1430 | 860 | 1.11 |

V-d = rotary calcined premium petroleum coke containing 1.4% sulfur
V-a = V-D calcined at 1750° C according to the invention (0.3% sulfur)
V-b = V-d graphitized at 3000° C (0% sulfur)
V-c = V-d mixed with 2.5% $Fe_2O_3$ and graphitized at 3000° C (0% sulfur)
Mix No. 15 = Invention
Mix Nos. 16 and 17 = Prior Art
Mix No. 18 = Control

EXAMPLE VI

A six hundred pound sample of rotary calcined low sulfur premium petroleum coke having a sulfur content of 0.25 percent by weight was placed in a 20 inch diameter by six foot long graphite induction furnace and processed according to the invention. It was heated to 1400° C and then the temperature was raised at the rate of 200° C per hour to 2100° C, held at this temperature for two hours and allowed to cool. This sample was designated VI-a. A second sample (VI-b), a control sample, had been manufactured in a conventional rotary calciner at approximately 1350° C. Each sample was crushed and screened so as to yield the particles and flour required for mixes of Type A.

Three electrode mixes were made, using particles and flour from samples VI-a and VI-b, using 110° C softening point coal tar pitch as binder. A mix, (No. 19) made using sample VI-a particles and VI-b flour, required 28.0 pph by weight of pitch and after extrusion into billets had a green density of 1.76 grams per cubic centimeter. A mix (No. 20), using sample VI-a particles and a 50/50 by weight mixture of sample VI-a flour and VI-b flour, required 31.0 pph pitch and, after extrusion into billets, had a green density of 1.75 grams per cubic centimeter. A third mix, (No. 21), using both particles and flour from normally calcined control sample VI-b, required 25.0 pph of pitch by weight and had an extruded green density of 1.75 per cubic centimeter.

The formed 6 inch diameter electrodes were cut into billets, baked, graphitized and tested in the same way as in Example I.

For the electrodes made with Mix No. 19, using particles according to the invention from sample VI-a, the average density was 1.69 g/cc and the average flexural strength was 1680 psi WG and 900 psi AG. The electrodes made with Mix No. 20, using particles according to the invention from sample VI-a and a 50/50 mixture of flour from VI-a and VI-b, had an average density of 1.69 g/cc and an average flexural strength of 1710 WG and 940 AG. The control sample (Mix No. 21) made with particles and flour from sample VI-b had an average density of 1.63 g/cc and flexural strength of 1110 WG and 740 AG. The improvements imparted to graphite electrodes using cokes calcined by our process can be seen in the table below.

TABLE VI

| Mix No. | Forming Data | | | Graphite Properties | | | |
|---|---|---|---|---|---|---|---|
| | Type of Coke | | pph Pitch | Density g/cc | Density g/cc | Flex Strength psi | | WG CTE $10^{-6°}$ C |
| | Particles | Flour | | | | WG | AG | |
| 19 Inv. | VI-a | VI-b | 28.0 | 1.76 | 1.69 | 1680 | 900 | 0.69 |
| 20 Inv. | VI-a | 50% VI-a 50% VI-b | 31.0 | 1.75 | 1.69 | 171C | 940 | 0.72 |
| 21 Control | VI-b | VI-b | 25.0 | 1.75 | 1.63 | 1110 | 740 | 0.56 |

VI-b = rotary calcined premium petroleum coke containing 0.25% sulfur
VI-a = VI-b calcined at 2100° C according to the invention (0.1% sulfur)
Mix Nos. 19 and 20 = Invention
Mix No. 21 = Control

EXAMPLE VII

The previous six examples have shown that premium (low CTE) petroleum cokes of sulfur content, ranging from 0.25% to 1.4%, when processed according to our invention and used in various proportions with regular coke in making graphite electrodes, impart significant improvements in properties to both fine-grained and coarse-grained stock. Previous examples were limited to heating rates of typically 100° C per hour through desulfurization and with a hold period of two hours at the maximum temperature. The present example shows that much more rapid heating rates and much shorter hold periods can be used and still yield a greatly improved coke.

Particles (through 10, on 20 Tyler mesh) of a rotary calcined low sulfur premium petroleum coke containing 0.7% sulfur, i.e., the same type of coke as described in Example III-c, were placed within the hopper of an induction heated four inch diameter graphite rotary calciner operating at 1900°–2000° C and rotating at approximately 5 RPM. The coke was then fed into the calciner with the aid of a split spiral screw. Throughput rate measurements showed that the coke particles were subjected to a heating rate of approximately 10,000° C per hour and passed through the hot zone of the calciner in a period of approximately 0.1 hour. The rotary calciner was filled with argon or nitrogen to protect the coke from oxidation and the hopper and collecting drum were connected to the rotary calciner with airtight seals. Some 350 pounds of 10/20 mesh particles were processed according to the invention by feeding them through the induction heated graphite rotary calciner. The average sulfur content of the coke (sample VII) after this treatment was 0.4%.

The finer particles and half of the flour needed for a mix of Type B were obtained by crushing and milling some of the 10/20 mesh particles of coke sample VII which were partially desulfurized as described above. The remainder of the flour was obtained by milling particles of the 'control' coke (same as Examples II-c and III-c). The mix, (No. 22) using sample VII particles and a 50/50 by weight mixture of sample VII flour and regular III-c flour, required 32.0 pph by weight of coal tar pitch binder and after extrusion into billets had a green density of 1.74 g/cc.

The formed 6 inch diameter electrodes were cut into billets, baked, graphitized and tested in the same manner as in Example I.

For the electrodes made with Mix No. 22, using particles according to the invention from sample VII and a 50/50 mixture by weight of flour from sample VII and VI-c, the average density was 1.65 g/cc and the average flexural strength measured with the grain was 2070 and against the grain 1240. These strengths compare well with those of similar coke processed according to the invention by batch induction heating in Example III and greatly exceed those of control stock made with sample III-c, as can be seen from the table below.

TABLE VII

| Mix No. | Type of Coke Particles | Flour | pph Pitch | Green Density g/cc | Density g/cc | Flex Strength psi WG | AG | WG CTE $10^{-6°}$ C |
|---|---|---|---|---|---|---|---|---|
| 22 Inv. | VII | 50% VII 50% III-c | 32.0 | 1.74 | 1.65 | 2070 | 1240 | 0.62 |
| 10 Control | III-c | III-c | 29.0 | 1.79 | 1.65 | 1280 | 920 | 0.60 |

III-c = rotary calcined premium petroleum coke containing 0.7% sulfur
VII = III-c heated to 1900-2000° C in an induction heated rotary calciner. Heating rate 10,000° C per hour, 0.1 hour at maximum temperature.
Mix No. 22 = Invention
Mix No. 10 = Control

EXAMPLE VIII

To demonstrate that cokes processed according to our invention can be improved by heating at even greater rates than in Example VII, we carried out 'flash calcining' experiments on both rotary calcined and raw premium coke containing 0.7% sulfur.

A six hundred pound sample VIII of rotary calcined petroleum coke containing 0.7% sulfur was 'flash calcined' by pouring the particles slowly (~150 pounds/hour) into a 20 inch diameter by six foot long graphite induction furnace which had been pre-heated to 2100° C. It was estimated that the average coke particle in this experiment was heated at a rate of 100,000° C/hour in the desulfurization range. The furnace was operated at 2100° C for one hour after being filled with coke. Therefore, the residence time of the coke at 2100° C ranged from 1 hour to 5 hours.

The flash calcined coke made as described in this example (sample VIII) was crushed to provide the particles needed for a mix of type B. The flour was derived from a control sample of regularly calcined coke of the same type (e.g., sample III-c). A mix made using this combination of cokes required 31.0 pph of coal tar pitch and after extrusion into billets had a green density of 1.78 g/cc. The formed 6 inch diameter electrodes were cut into billets, baked, graphitized and tested in the same manner as in Example I.

Electrodes made from Mix No. 23, using particles derived from our flash calcined coke and regular flour (such as sample III-c), had an average density of 1.70 g/cc and a flexural strength measured with the grain of 2060 and against the grain 1100. These strength values also greatly exceed those of the control sample (mix No. 10) as can be seen from the table below.

TABLE VIII

| Mix No. | Type of Coke Particles | Flour | pph pitch | Green Density g/cc | Density g/cc | Flex Strength psi WG | AG | WG CTE $10^{-6°}$ C |
|---|---|---|---|---|---|---|---|---|
| 23 Inv. | VIII | III-c | 31.0 | 1.78 | 1.70 | 2060 | 1100 | 0.70 |
| 10 Con. | III-c | III-c | 29.0 | 1.79 | 1.65 | 1280 | 920 | 0.60 |

III-c = Rotary premium petroleum coke containing 0.7% sulfur
VIII = III-c flash calcined by feeding into a graphite induction furnace at 2100° C (0.1% sulfur after this calcine)

EXAMPLE IX

A six hundred pound sample of raw premium petroleum coke containing 0.7% sulfur was "flash calcined" by pouring the particles slowly (~120 pounds/hour) into a 20 inch diameter by six foot long graphite induction furnace which had been preheated to 2100° C. It was estimated that the average coke particle in this experiment was heated at a rate of 100,000° C/hour in the desulfurization temperature range. The furnace was operated for one hour after being filled with coke. Therefore, the residence time of the coke at 2100° C ranged from 1 hour to 6 hours.

The Flash calcined coke made as described in this example (sample IX) was crushed to provide the particles needed for a mix of type B. The flour was derived from a control sample of regularly calcined coke of the same type (sample III-c). A mix (No. 24) made using this combination of cokes required 31.5 pph of coal tar pitch and after extrusion into billets had a green density of 1.75 g/cc. The formed 6 inch diameter electrodes were cut into billets, baked, graphitized and tested in the same manner as in Example I.

Electrodes made with Mix No. 24 using particles derived from our flash calcined raw coke sample IX and regular flour (sample III-c) had an average density of 1.67 g/cc and a flexural strength measured with the grain of 2150 and against the grain 1350. These strength values greatly exceed those of the control sample III-c, as can be seen from the table below.

TABLE IX

| Mix No. | Type of Coke Particles | Flour | pph Pitch | Green Density g/cc | Density g/cc | Flex Strength psi WG | AG | WG CTE $10^{-6}$ /° C |
|---|---|---|---|---|---|---|---|---|
| 24 Inv. | IX | III-c | 31.5 | 1.75 | 1.67 | 2150 | 1350 | 0.78 |
| 10 Con. | III-c | III-c | 29.0 | 1.79 | 1.65 | 1280 | 920 | 0.60 |

III-c = rotary calcined premium petroleum coke containing 0.7% sulfur
IX = raw petroleum coke of 0.7% sulfur content, flash calcined by feeding into an induction furnace at 2100° C (0.1% sulfur in coke after this treatment)

EXAMPLE X

To demonstrate that our process leads to strength improvements in electrodes derived from sulfur-free cokes, we coked a 300 pound sample of a sulfur-free quench oil (0.01% S) in an autoclave under a pressure of 650 psig of nitrogen to a temperature of 650° C over a period of approximately 50 hours. A sample of the coke obtained was processed according to the invention. It was placed within a 20 inch diameter graphite induction furnace, heated rapidly to 600° C, then at 300° C/hour to 2100° C and held at 2100° C for one hour and allowed to cool. A second sample, a control sample, was placed within the induction furnace, heated rapidly to 600° C, then at 300° C/hr to 1400° C, held at 1400° C for one hour and allowed to cool. The coke processed according to the invention was designated X-a, the control coke X-b.

Two small (35 pound) electrode mixes of type B were made using coke fillers consisting of 55 percent by weight of particles from both samples X-a and X-b with 45 percent by weight of flour from different samples, using sufficient binder. The binder was the usual coal tar pitch with a softening temperature of 110° C. A mix (No. 25) using sample X-a particles and 50/50 by weight mixture of sample X-a and X-b flour required 30.0 parts per hundred weight of pitch and after extrusion into 2.5 inch diameter billets had a green density of 1.75 g/cc. A second mix (No. 26) using both calcined particles and flour from control sample X-b was made and found to require 27.5 parts per hundred by weight of pitch and had an extruded green density of 1.78 g/cc.

The formed 2.5 inch diameter electrodes were cut into 14 inch long rods. One rod from each electrode was packed in coke inside an electrically heated pot furnace and heated at a rate of 2° C per hour to 500° C, then at 10° C/hour up to 900° C and held at the baking temperature of 900° C for one hour. Another rod from each electrode was packed in coke inside an inductively heated autoclave and heated under 650 psig of nitrogen at a rate of 25° C/hour to 650° C. These latter rods were then transferred to another baking furnace operating at atmospheric pressure and reheated to 900° C at a rate of 10° C/hour. Both regular and pressure baked samples were then graphatized as described in Example I. From each of the two graphatized rods there were cut 10 with-grain and 10 cross-grain test samples for measurement of density, resistivity and flexural strength and 2 with-grain samples for measurement of coefficient of thermal expansion. The flexural test specimens in this Example were 0.375 inch square in section, compared with 1.00 inch square for pieces cut from the six inch diameter billets.

For the graphite made with Mix No. 25 using sample X-a particles and a 50/50 by weight of sample X-a and X-b flour, the average density was 1.69 g/cc, the average resistivity measured with the grain was 4.8 and against the grain 10.1, the average flexural strength measured with the grain was 1790 and against the grain 950, while the average coefficient of thermal expansion measured with the grain was 0.11. For the graphite made with Mix No. 26 using particles and flour which had been calcined at 1400° C (X-b), the average density was 1.69 g/cc, the average resistivity measured with the grain was 4.6 and against the grain 10.4, the average flexural strength measured with the grain was 1640 and against the grain 810, while the average coefficient of thermal expansion measured with the grain was zero.

TABLE X

| Mix No. | Forming Data | | | | Graphite Properties | | | |
|---|---|---|---|---|---|---|---|---|
| | Type of Coke | | pph Pitch | Green Density g/cc | Density g/cc | Flex Strength psi | | WG CTE $10^{-6°}$ C |
| | Particles | Flour | | | | WG | AG | |
| 25 Inv. | X-a | 50% X-a 50% X-b | 30.0 | 1.75 | 1.69 | 1790 | 950 | 0.11 |

TABLE X-continued

| Mix No. | Forming Data | | | | Graphite Properties | | | |
|---|---|---|---|---|---|---|---|---|
| | Type of Coke | | pph Pitch | Green Density g/cc | Density g/cc | Flex Strength psi | | WG CTE $10^{-6°}$ C |
| | Particles | Flour | | | | WG | AG | |
| 26 Con. | X-b | X-b | 27.5 | 1.78 | 1.69 | 1640 | 810 | 0.00 |

X-b = Quench Oil coked at 650 psig and calcined at 1400° C for one hour (0.01% S)
X-a = Quench Oil coked at 650 psig and calcined at 2100° C for one hour (0.01% S)

EXAMPLE XI

The previous ten Examples showing improvements in graphite electrode properties resulting from thermal desulfurization or high temperature calcining are all in reference to premium cokes, i.e., those which impart the lowest values of thermal expansion coefficient to the graphite electrodes. The present example and the next three examples are cited to show that improvements in graphite electrodes due to our method of coke calcining also apply to regular cokes, i.e., those which yield graphite electrodes with significantly higher thermal expansion coefficients than those of graphite derived from premium cokes.

A 70 pound sample of a high softening point pitch residue from an Advanced Cracking Reactor process was coked in an autoclave under a pressure of 100 psig of nitrogen to a temperature of 550° C over a period of approximately 30 hours. This sample of coke was found to contain 2.0% sulfur and was processed according to the invention. It was placed within a 17 inch diameter graphite induction furnace, heated rapidly to 500° C, then at 300° C/hr to 1400° C and finally at 100° C/hr to 1650° C and held at 1650° C for 2 hours. After this heat treatment the coke (sample XI-a) was found to contain only 0.3% sulfur.

A second 70 pound sample of the Advanced Cracking Reactor pitch residue was coked in an autoclave under a pressure of 650 psig of nitrogen to a temperature of 550° C over a period of approximately 30 hours. This sample of coke (XI-b) was found to contain 2.05% sulfur and was processed as a control sample for comparison with XI-a. It was placed within a 17 inch diameter graphite induction furnace, heated rapidly to 500° C, then at 300° C/hr to 1400° C and held at 1400° C for one hour. After this calcining operation, the coke contained 2.0% sulfur.

Two small (35 pound) electrode mixes of Type B were made using coke fillers consisting of 55 percent by weight of particles from both examples XI-a and XI-b with 45 percent by weight of particles from different samples, using sufficient coal tar pitch binder. A mix (No. 27) using sample XI-a particles and a 50/50 by weight mixture of sample XI-a and XI-b flour required 33.5 parts per hundred by weight of pitch and after extrusion into 2.5 inch diameter rods had a green density of 1.72 g/cc. A second mix (No. 28) using both calcined particles and flour from control sample XI-b was made and found to require 28.5 pph by weight of pitch and had an extruded green density of 1.76 g/cc.

The formed 2.5 inch diameter stock was cut into 14 inch long rods, baked, graphitized and tested in the same manner as in Example X.

For the electrodes made with Mix No. 27, using particles XI-a processed according to the invention and a 50/50 by weight mixture of flour from XI-a and regular flour XI-b, the average density was 1.64 g/cc, the average resistivity measured with the grain was 7.3 and against the grain 11.6, the average flexural strength measured with the grain was 2090 and against the grain 1220, while the average CTE measured with the grain was 0.80. In contrast, electrodes made using particles and flour from control sample XI-b (Mix No. 28) had an average density of 1.60 g/cc, an average resistivity measured with the grain of 9.5 and against the grain 12.5, an average flexural strength measured with the grain of 1130 and against the grain 870, while the average CTE measured with the grain was 1.40. Some of these data are summarized below.

TABLE XI

| Mix No. | Forming Data | | | Graphite Properties | | | |
|---|---|---|---|---|---|---|---|
| | Type of Coke | | pph pitch | Green Density g/cc | Density g/cc | Flex Strength psi | WG CTE $10^{-6}$/°C |
| | Particles | Flour | | | | WG    AG | |
| 27 Inv. | XI-a | 50% XI-a | 33.5 | 1.72 | 1.64 | 2090  1220 | 0.80 |
| 28 Con. | XI-b | XI-b | 28.0 | 1.76 | 1.60 | 1130  870 | 1.40 |

XI-a = Advanced Cracking Reactor pitch residue coked at 100 psig and calcined at 1650° C for 2 hours
XI-b = Advanced Cracking Reactor pitch residue coked at 650 psig and calcined at 1400° C for 1 hour

EXAMPLE XII

A six hundred pound sample of rotary calcined regular petroleum coke having a sulfur content of 1.4 percent by weight was placed in a 20 inch diameter by six foot long graphite induction furnace and processed according to the invention. It was heated in the absence of air to 1400° C and then the temperature was raised at the rate of 75° C per hour to 1600° C and the coke was held at this temperature for 2 hours and allowed to cool. Analyses showed that this coke sample (XII-a) contained 0.3% sulfur after the 1600° C calcining. Sample XII-b, a control sample, had been heated in a rotary calciner to the conventional calcining temperature of 1350° C. Each sample was crushed and screened to produce the particles and flour needed for mixes of Type A.

Three electrode mixes were made using petroleum coke particles and flour in various proportions from samples XII-a and XII-b and coal tar pitch of 100° C softening temperature. A mix (No. 29) using sample XII-a particles and XII-b flour required 28.0 pph by weight of pitch and after extrusion into billets had a green density of 1.68 g/cc. A mix (No. 30) using sample XII-a particles and 50/50 by weight mixture of XII-a flour and XII-b flour required 29.0 pph by weight of pitch and after extrusion into billets had a green density of 1.66 g/cc. A third mix (No. 31) using both particles and flour from control sample XII-b required 26.0 pph by weight of pitch and after extrusion into billets had a green density of 1.70 g/cc.

The formed 6 inch diameter electrodes were cut into billets, baked, graphitized and tested in the same manner as in Example I.

For the electrodes made with Mix No. 29, using particles according to the invention from sample XII-a and regular flour from sample XII-b, the average density was 1.61 g/cc, the average resistivity was 7.2 with-grain and 9.3 against the grain, the average flexural strength was 1660 with-grain and 1180 against the grain, and the CTE was 1.30 with-grain and 2.08 against-grain. The electrodes made with Mix No. 30, using particles from samples XII-a and a 50/50 by weight mixture of XII-a and XII-b flour, had a density of 1.58 g/cc, a resistivity of 9.4 with-grain and 12.0 against-grain, a flexural strength of 1470 with-grain and 1160 against-grain, and a CTE of 1.20 with-grain and 1.89 against-grain. The electrodes made from control sample XII-b Mix No. 31 had a density of 1.58 g/cc, a resistivity of 7.9 with-grain and 9.7 against-grain, a flexural strength of 1100 with-grain and 830 against-grain, and a CTE of 1.59 with-grain and 2.05 against-grain.

TABLE XII

| Mix No. | Forming Data | | | Graphite Properties | | | |
|---|---|---|---|---|---|---|---|
| | Type of Coke | | pph Pitch | Green Density g/cc | Density g/cc | Flex Strength psi | WG CTE $10^{-6}$/°C |
| | Particles | Flour | | | | WG    AG | |
| 29 Inv. | XII-a | XII-b | 28.0 | 1.68 | 1.61 | 1660  1180 | 1.30 |
| 30 Inv. | XII-a | 50% XII-a 50% XII-b | 29.0 | 1.66 | 1.58 | 1470  1160 | 1.20 |
| 31 Con. | XXI-b | XXI-b | 26.0 | 1.70 | 1.58 | 1100  830 | 1.59 |

XII-b = rotary calcined regular coke containing 1.4% sulfur
XII-a = XII-b calcined at 1600° C

EXAMPLE XIII

A six hundred pound sample of rotary calcined high CTE petroleum coke having a sulfur content of 1.4 percent by weight was placed in a 20 inch diameter by six foot long graphite induction furnace and processed according to the invention. It was heated in the absence of air to 1400° C and then the temperature was raised at the rate of 50° C/hr to 1750° C and the coke was held at this temperature for 2 hours and allowed to cool. Analyses showed that this coke sample (XIII-a) contained 0.3% sulfur after the 1750° C calcining. Sample XIII-b, a control sample, had been heated in a rotary calciner to the conventional calcining temperature of 1350° C. Each sample was crushed and screened to produce the particles and flour needed for mixes of the Type C (see Table I).

Three electrode mixes were made using petroleum coke particles and flour in various proportions from samples XIII-a and XIII-b and coal tar pitch of 110° C softening temperature. A mix (No. 32) using sample XIII-a particles and XIII-b flour required 30.5 pph by weight of pitch and after extrusion had a green density of 1.69 g/cc. A mix (No. 33) using XIII-a particles and a 50/50 by weight mixture of flour from samples XIII-a and XIII-b required 33.5 pph by weight of pitch and after extrusion had a green density of 1.69 g/cc. A third mix (No. 34) using both particles and flour from control sample XIII-b required 27.5 pph by weight of pitch and after extrusion had a green density of 1.75 g/cc.

The formed 6 inch diameter stock was cut into billets, baked, graphitized and tested in the same manner as in Example I.

For the graphite electrodes made with Mix No. 32 using particles according to the invention from sample XIII-a and regular flour from sample XIII-b, the average density was 1.64 g/cc, the flexural strength was 2020 with-grain and 1420 against-grain and the CTE was 1.62 with-grain and 2.44 against-grain. The graphite electrodes made using particles from sample XIII-a and 50/50 by weight mixture of flour from amples XIII-a and XIII-b (Mix No. 33) had an average density of 1.62 g/cc, a flexural strength of 1860 with-grain and 1330 against-grain, and a CTE of 1.42 with-grain and 2.38 against-grain. The electrodes made from control sample XIII-b (Mix No. 34) had an average density of 1.63 g/cc, a flexural strength of 1520 with-grain and 1130 against-grain, and a CTE of 1.72 with-grain and 2.50 against-grain. The table below shows the improvements in graphite electrode properties obtained with cokes made according to our invention.

TABLE XIII

| | Forming Data | | | Graphite Properties | | | |
|---|---|---|---|---|---|---|---|
| | Type of Coke | | | Green Density | Density | Flex Strength psi | WG CTE $10^{-6°}$ |
| Mix No. | Particles | Flour | pph Pitch | g/cc | g/cc | WG   AG | C |
| 32 Inv. | XIII-a | XIII-b | 30.5 | 1.69 | 1.64 | 2020  1420 | 1.62 |
| 33 Inv. | XIII-a | 50% XIII-a 50% XIII-b | 33.5 | 1.69 | 1.62 | 1860  1330 | 1.42 |
| 34 Con. | XIII-b | XIII-b | 27.5 | 1.75 | 1.63 | 1520  1130 | 1.72 |

XIII-b = rotary calcined high CTE petroleum coke (1.4% sulfur)
XIII-a = XIII-b calcined at 1750° C for 2 hours (0.3% sulfur)

EXAMPLE XIV

To illustrate the beneficial effects of our coke calcining process on the properties of stock with quite fine-grain particles, we evaluated our coke in stock derived from mix design D (see Table A) in which the largest particle size was through 20, on 35 Tyler mesh.

A six hundred pound sample of rotary calcined regular petroleum coke having a sulfur content of 1.4 percent by weight was placed in a 20 inch diameter by six foot long graphite induction furnace and processed according to the invention. It was heated in the absence of air to 1400° C and then the temperature was raised at the rate of 50° C/hr to 1750° C and the coke was held at this temperature for 2 hours and allowed to cool. Analyses showed that this coke sample (XIV-a) contained 0.3% sulfur after the 1750° C calcining. Sample XIV-b, a control sample, had been heated in a rotary calciner to the convential calcining temperature of 1350° C. Each sample was crushed and screened to produce the particles and flour needed for mixes of Type D.

Four electrode mixes were prepared using petroleum coke particles and flour in various proportion from samples XIV-a and XIV-b and coal tar pitch of 110° C softening temperature. A mix (No. 35) using XIV-a particles and XIV-b flour required 33.0 pph by weight of pitch and after extrusion had a green density of 1.71 g/cc. A mix (No. 36) using XIV-a particles and a 50/50 by weight mixture of flour from XIV-a flour and XIV-b flour required 35.5 pph by weight of pitch and after extrusion had a green density of 1.68 g/cc. A mix (No. 37) using a 50/50 by weight mixture of both particles and flour from XIV-a and XIV-b required 34.0 pph pitch and after extrusion had a green density of 1.67 g/cc. A control mix (No. 38) made with coke sample XIV-B required 28.5 pph pitch and after extrusion had a green density of 1.73 g/cc.

The formed 6 inch diameter stock was cut into billets, baked, grapitized and tested in the same manner as in Example I.

For the graphite electrodes made using particles processed according to the invention from sample XIV-a and regular flour from sample XIV-b, (Mix No. 35)) the average density was 1.66 g/cc, the average flexural strength was 2530 with-grain and 1760 against-grain, and the average CTE was 1.56 with-grain and 2.87 against-grain. Graphite made using particles from XIV-a and 50/50 mixture of flour from XIV-a and XIV-b (Mix No. 36) had an average density of 1.64 g/cc, a flexural strength of 2370 with-grain and 1610 against-grain, and a CTE of 1.59 with-grain and 2.89 against-grain. Graphite made using a 50/50 by weight mixture of particles and flour from XIV-a and XIB-b (Mix No. 37) had an average density of 1.62, a flexural strength of 2360 with-grain and 1710 against-grain, and a CTE of 1.65 with-grain and 2.89 against-grain. The graphite electrodes made from control sample XIV-b (Mix No. 38) had a density of 1.64 g/cc, a flexural strength of 1870 with-grain and 1270 against-grain, and a CTE of 1.83 with-grain and 2.95 against grain. Some of these data are summarized below.

TABLE XIV

| | Forming Data | | | Graphite Properties | | | |
|---|---|---|---|---|---|---|---|
| | Type of Coke | | | Green Density | Density | Flex Strength psi | WG CTE $10^{-6}$ |
| Mix No. | Particles | Flour | pph pitch | g/cc | g/cc | WG   AG | /° C |
| 35 Inv. | XIV-a | XIV-b | 33.0 | 1.71 | 1.66 | 2530  1760 | 1.56 |
| 36 Inv. | XIV-a | 50% XIV-a 50% XIV-b | 35.5 | 1.68 | 1.64 | 2370  1610 | 1.59 |
| 37 Inv. | 50% XIV-a 50% XIV-b | 50% XIV-a 50% XIV-b | 34.0 | 1.67 | 1.62 | 2360  1710 | 1.65 |
| 38 Con. | XIV-b | XIV-b | 28.5 | 1.73 | 1.64 | 1870  1270 | 1.83 |

XIB-b = rotary calcined high CTE petroleum coke (1.4% sulfur)
XIV-a = XIV-b calcined at 1750° C for 2 hours (0.3% sulfur)

EXAMPLE XV

This example is cited to show that the improvements obtained in graphite electrodes by calcining petroleum cokes according to our invention can also be obtained when our process is applied to cokes derived from coal.

Anticipated future shortages of petroleum have resulted in efforts to derive clean fuels from coal. One such process is called solvent refining. The solvent refined coal process, developed by Catalytic, Inc., in collaboration with Southern Systems, Inc., involves liquifaction of coal in the presence of hydrogen. Coal, slurried in process solvent, is heated with hydrogen at pressures up to 2800 psig and the coal solution is filtered to remove inorganics and undissolved carbonaceous material. The filtered coal liquid is vacuum flashed to remove most of the solvent and the residue solidified by pouring into water. The SRC product, which is intended as a low-ash, low-sulfur fuel for power stations, is a hard pitch-like material having a softening point in the range 180°-200° C.

A 225 pound sample of the solvent refined coal (SRC) was placed in an autoclave and coked to 650° C under a pressure of 650 psig of nitrogen in 36 hours. The as-coked material was analyzed and found to contain 0.5% sulfur. A sample of this coke was placed in a 20 inch diameter by 6 foot long induction furnace and processed according to the invention. It was heated rapidly to 600° C, then at 300° C/hour to 1400° C and finally at 100° C/hour to 1700° C and held at 1700° C for one hour. After cooling, this sample (XV-a) was analyzed and found to contain 0.3% sulfur. A second sample of the as-coked material was processed as a control sample (XV-b) by heating it rapidly to 600° C in a graphite induction furnace, and then at 300° C/hour to 1400° C and holding at 1400° C for one hour. This regularly calcined sample was analyzed and found to contain 0.5% sulfur.

Two small (35 pound) electrode mixes of Type B were made using coke particles and flour from samples XV-a and XV-b. A Mix (No. 39) using sample XV-a particles and flour required 35.0 pph pitch by weight and after extrusion had a green density of 1.72 g/cc. A mix (No. 40) using control Sample XV-b required 30.0 pph pitch by weight and after extrusion had a green density of 1.71 g/cc.

The formed 2.5 inch diameter stock was cut into 14 inch long rods, baked, graphitized and tested in the same manner as in Example X.

For the electrodes made using particles and flour from sample XV-a, processed according to the invention, the graphite density averaged 1.63 g/cc, the flexural strength was 1800 with-grain and 1110 against-grain, and the CTE was 0.78 with-grain. Graphite made with control sample XV-b had a density of 1.61 g/cc, a flexural strength of 1620 with-grain and 1110 against-grain, and a with-grain CTE of 0.84. These results are summarized below.

TABLE XV

| Mix No. | Forming Data | | | | Graphite Properties | | | |
|---|---|---|---|---|---|---|---|---|
| | Type of Coke | | pph Pitch | Green Density g/cc | Density g/cc | Flex Strength psi | | WG CTE $10^{-6°}$ C |
| | Particles | Flour | | | | WG | AG | |
| 39 Inv. | XV-a | XV-a | 35.0 | 1.73 | 1.63 | 1800 | 1110 | 0.78 |
| 40 Con. | XV-b | XV-b | 30.0 | 1.71 | 1.61 | 1620 | 1110 | 0.84 |

XV-a = Solvent Refined Coal coked at 650 psig and calcined at 1700° C for one hour (0.3% sulfur)
XV-b = Solvent Refined Coal coked at 650 psig and calcined at 1400° C for one hour (0.5% sulfur)

What is claimed is:

1. In the process of producing graphitized articles of a quality suitable for use as graphite electrodes by forming, baking and graphitizing a mixture of coke filler and binder, an improvement resulting in articles of improved flexural strength which comprises heating at least a portion of said coke filler in the absence of air at a temperature between about 1600° C and about 2200° C for a period of at least 0.1 hour prior to mixing said particles with said binder.

2. A process according to claim 1 wherein said coke filler is derived from petroleum.

3. A process according to claim 1 wherein said coke filler is derived from coal.

4. A process according to claim 1 wherein the sulfur content of said coke filler prior to said heating is below about one percent by weight and the temperature range is between about 1900° C and about 2200° C.

5. A process according to claim 1 wherein the sulfur content of said coke filler prior to said heating is one percent by weight or above and the temperature range is between about 1600° C and about 1750° C.

6. A process according to claim 1 wherein said filler comprises a mixture of relatively coarse coke particles and relatively fine coke flour.

7. A process according to claim 6 wherein both said particles and said flour are so heated prior to mixing with said binder.

8. A process according to claim 6 wherein said particles are so heated prior to mixing with said binder and said flour is conventionally calcined prior to said mixing.

9. A process according to claim 6 wherein said particles and a portion of said flour are so heated prior to mixing with said binder and the remainder of said flour is conventionally calcined prior to heating.

10. A green carbon electrode capable of being baked and graphitized to yield a graphite electrode of improved flexural strength, which green electrode has been formed from a mixture of binder and coke filler, at least a portion of said filler having been heated in the absence of air at a temperature between about 1600° C and about 2200° C for a period of at least 0.1 hour before being mixed with said binder.

11. A green carbon electrode according to claim 10 wherein said coke filler is derived from petroleum.

12. A green carbon electrode according to claim 10 wherein said coke filler is made from coke derived from coal.

13. A green carbon electrode according to claim 10 wherein said filler comprises a mixture of relatively course coke particles and relatively fine coke flour.

14. A green carbon electrode according to claim 13 wherein both said particles and said flour have been so heated prior to being mixed with said binder.

15. A green carbon electrode according to claim 13 wherein said particles have been so heated prior to being mixed with said binder and said flour has been conventionally calcined prior to said mixing.

16. A green carbon electrode according to claim 13 wherein said particles and a portion of said flour have been so heated prior to being mixed with said binder and the remainder of said flour has been conventionally calcined prior to said mixing.

17. A baked carbon electrode capable of being graphitized to yield a graphite electrode of improved flexural strength, said baked carbon electrode having been baked from a green electrode formed from a mixture of binder and coke filler, at least a portion of said filler having been heated in the absence of air at a temperature between about 1600° C and about 2200° C for a period of at least 0.1 hour before being mixed with said binder.

18. A baked carbon electrode according to claim 17 wherein said coke filler is derived from petroleum.

19. A baked carbon electrode according to claim 17 wherein said coke filler is made from coke derived from coal.

20. A baked carbon electrode according to claim 17 wherein said filler comprises a mixture of relatively coarse coke particles and relatively fine coke flour.

21. A baked carbon electrode according to claim 20 wherein both said particles and said flour have been so heated prior to being mixed with said binder.

22. A baked carbon electrode according to claim 20 wherein said particles have been so heated prior to being mixed with said binder and said flour has been conventionally calcined prior to said mixing.

23. A baked carbon electrode according to claim 20 wherein said particles and a portion of said flour have been so heated prior to being mixed with said binder and the remainder of said flour has been conventionally calcined prior to said mixing.

24. A graphite electrode of improved flexural strength baked and graphitized from a green carbon electrode which has been formed from a mixture of binder and coke filler, at least a portion of said filler having been heated in the absence of air at a temperature between about 1600° C and about 2200° C for a period of at least 0.1 hour before being mixed with said binder.

25. A graphite electrode according to claim 24 wherein said coke filler comprises a mixture of relatively coarse coke particles and relatively fine coke flour.

26. A graphite electrode according to claim 25 wherein both said particles and said flour have been so heated prior to being mixed with said binder.

27. A graphite electrode according to claim 25 wherein said particles have been so heated prior to being mixed with said binder and said flour has been conventionally calcined prior to said mixing.

28. A graphite electrode according to claim 25 wherein said particles and a portion of said flour have been so heated prior to being mixed with said binder and the remainder of said flour has been conventionally calcined prior to said mixing.

* * * * *